United States Patent [19]
Bailes et al.

[11] Patent Number: 5,352,343
[45] Date of Patent: Oct. 4, 1994

[54] SEPARATION OF THE COMPONENTS OF LIQUID DISPERSIONS

[75] Inventors: Philip J. Bailes, Baildon; Martin Watson, Preston, both of United Kingdom

[73] Assignee: The University of Bradford, Baildon, United Kingdom

[21] Appl. No.: 53,761

[22] Filed: Apr. 5, 1993

[30] Foreign Application Priority Data

Oct. 6, 1990 [GB] United Kingdom ............... 9021756

[51] Int. Cl.⁵ ............................................. C02F 1/463
[52] U.S. Cl. ............................. 204/149; 204/164; 204/186; 204/188; 204/191; 204/302; 204/305
[58] Field of Search ............... 204/149, 164, 186, 188, 204/191, 302, 305

[56] References Cited

U.S. PATENT DOCUMENTS 1,558,382  10/1925  Marx ................................. 204/149
4,116,790   9/1978  Prestridge ......................... 204/188
4,302,310  11/1981  Watson et al. ..................... 204/186
4,308,127  12/1981  Prestridge et al. ................ 204/302

*Primary Examiner*—John Niebling
*Assistant Examiner*—Arun S. Phasge
*Attorney, Agent, or Firm*—Darby & Darby

[57] ABSTRACT

The invention provides a method of separating the components of a liquid/liquid dispersion or emulsion, comprising the step of applying simultaneously to the dispersion or emulsion both an electric field and an aligned centrifugal force, in such a way as to set up a bulk interface at right angles to the direction of the electric field and centrifugal force, the bulk interface being located within the electric field between the dispersion or emulsion and one separated component thereof. The combined effects of the electric field and centrifugal force break the liquid emulsion, preventing the formation of a sponge layer at the interface and hence allowing more effective separation of the components than has previously been possible. The invention also provides apparatus for carrying out the claimed method of separation.

14 Claims, 7 Drawing Sheets

SEPARATION OF THE COMPONENTS OF LIQUID DISPERSIONS

This is a continuation of international application Ser. No. PCT/GB91/01732, filed Oct. 7, 1991. This invention relates to methods and apparatus for separating the components of liquid dispersions or emulsions, for example, separating two immiscible or partially miscible liquids.

There are many processes in which it is necessary to separate out the components of a liquid/liquid dispersion, for example, the separation of water droplets from petroleum derivatives or oil and the extraction of a metal ion from an aqueous phase into an organic phase. Where the densities of the liquids are sufficiently different, then the separation can be effected in settling tanks. The denser liquid or phase simply sinks below the less dense phase and, given sufficient time, the two phases can be separated sufficiently to be drawn off. However, such a process requires the use of large tanks taking up a correspondingly large amount of space and, at least for solvent extraction processes, taking up a large volume of expensive solvents. Furthermore, this separation procedure may be the slowest stage of a more extensive process and therefore determine the throughput of the complete process.

It is known that the application of an electric or an electro-static field can speed up the separation of a dispersion, including an emulsion, into its components, where the continuous phase of the mixed liquids is an electrical insulator and the dispersed phase is an electrical conductor.

It is also known to apply a centrifugal force to a dispersion to separate heavier fluid from a mixture containing one or more less dense fluids. The higher the centrifugal force, the greater the tendency to separate the liquids of the mixture. However, there is also a tendency with high centrifugal forces to stabilise the mixture.

U.S. Pat. No. 4,116,790 discloses a method for separating the fluids of a mixture by passing the mixture through an electric field and centrifuge in sequence. The electric field is used to enlarge the drops of the dispersed phase to a sufficient size such that the centrifugal force is able to move the drops in separation without developing sufficient shear force to break up the drops. However, large droplets can remain in the gravity portion of the apparatus and fail to coalesce with the bulk interface due to the large amount of surfactant around the droplets.

When attempting to separate the components of a very stable emulsion of the water-in-oil type, especially a liquid membrane emulsion, a "sponge" layer often forms at the interface between the separated water layer and the mixture. This sponge layer is thought to be made of a water-in-oil emulsion with a very high water content. In a typical apparatus using an electric field to aid separation, the water droplets, which have grown in size due to the electric field, fall to the bulk interface under the influence of gravity but do not coalesce with it immediately. The rate at which the film between the droplet and the interface drains governs the rate at which the droplets coalesce with the bulk interface. The presence of a surfactant or a highly viscous continuous phase will reduce the rate of film drainage.

It has now been discovered that more effective separation of the components of a liquid/liquid dispersion or emulsion can be achieved by applying simultaneously both an electric field and a centrifugal force in such a way as to set up a bulk interface at right angles to the direction of the aligned electric field and centrifugal force, the bulk interface being located within the electric field. In this way, both the electric field and the centrifugal force will combine together to break the liquid emulsion and to prevent the formation of a significant sponge layer at the interface.

The electric field may be applied by means of one or more pairs of electrodes. Preferably, the electric field is a unidirectional electrostatic field applied between a relatively high voltage electrode and a relatively low voltage electrode. More preferably, the high voltage electrode is separated from the dispersion by a layer of electrically insulating material.

Preferably, the dispersion is one of at least one electrically-conducting liquid in one or more liquids of electrically lower electrical conductivity.

Preferably, the voltage applied to the relatively high voltage electrode is between 10 and 20 kV. Preferably, the voltage across the electrodes is pulsed at a frequency of from 1.5 to 50 Hs.

The present invention also provides apparatus for carrying out the process of the invention, the apparatus including means for applying simultaneously an electric field and an aligned centrifugal force so as to establish within the electric field a bulk interface between the mixture and one separated component thereof.

The apparatus may be appropriate for treating a liquid mixture on a batch or a continuous basis.

The centrifugal force can be implemented either by use of a mechanical centrifuge or by a hydrocyclone. Apparatus in accordance with the present invention preferably includes a mechanical centrifuge which has the advantage that its centrifugal force can be increased by simply increasing the rotational speed. In a hydrocyclone the centrifugal force can only be achieved by increasing the flowrate through it, and this may lead to problems in ensuring that the emulsion entering the unit is constant for all operating conditions.

Apparatus for use in a continuous liquid/liquid separation process preferably includes a vessel mounted for rotation about a vertical axis and including a pair of electrodes for applying the electric field, one of said pair surrounding, and being radially separated from the other of said electrodes. More preferably, the outer electrode is located at or near the periphery of the vessel and the inner electrode is located at or near the vertical axis of the vessel. In a particularly preferred embodiment, the inner electrode surrounds an inlet for the liquid/liquid mixture, said inlet extending along the vertical axis of the vessel and with apertures such that the liquid/liquid mixture enters the bulk liquid located within the vessel through radially directed apertures. In such apparatus, a vertical bulk interface between the separated out, denser liquid and the liquid mixture is set up between the electrodes so that the electric field and the centrifugal force are both directed across the bulk interface.

The present invention has a variety of applications, examples of which are:
  breaking of liquid membrane emulsions;
  removal of brine droplets from crude oil;
  removal of finely dispersed water in petroleum distillates; and
  separation of dispersions arising in liquid/liquid extraction operations.

Preferably, the vessel is capable of being rotated at a speed in the range of 1000–2,000 rpm, more preferably 1,500–1,800 rpm.

BRIEF DESCRIPTION OF THE DRAWINGS

An embodiment of the present invention will now be described, by way of example only, and with reference to the accompanying drawings, in which:

Referring to FIG. 1 of the accompanying drawings, apparatus in accordance with the present invention includes a cylindrical vessel 1 mounted for rotation about a vertical axis and being closed at the bottom and partially closed at the top. Associated with the circular cylindrical wall of the vessel is a relatively low voltage electrode of the apparatus which is connected to earth. Arranged concentrically within the cylindrical vessel is an electrode and inlet assembly 3 consisting of two circular tubes arranged concentrically. The annular gap between these two tubes contains an electrolyte 5 which is in contact with the high-voltage supply via a wire 7 so that the electrolyte 5 forms the high-voltage electrode. The inner of the two tubes is an emulsion inlet pipe which terminates within the vessel in a distributor cap 9 having radially directed apertures 11.

The only rotating part of the apparatus is the cylindrical vessel 1. In use, liquid water-in-organic emulsion is passed into the apparatus through the inner tube of electrode and inlet assembly 3 via distributor cap 9 so that the emulsion enters the bulk fluid located in the vessel in a radial direction. The vessel 1 is spinning and an electric field is applied between the inner high-voltage electrolyte electrode and the outer earthed electrode. The electrode and inlet assembly 3 is constructed from ABS plastics material which provides good insulation around the inner liquid electrode. The liquid mixture located within vessel 1 is subjected to the forces of electric and centrifugal fields, both acting in a radial direction. As a result, the heavier water components of the water-in-organic emulsion is caused to coalesce and is moved radially outward. It forms an aqueous layer on the inner periphery of the vessel 1. Once this layer is formed the centrifugal and electric fields act across the bulk interface between this layer and the liquid mixture within the vessel.

Separated aqueous component is drawn off from the inner periphery of the vessel 1 as indicated at 11, and organic phase is drawn off adjacent the electrode and inlet assembly 3 as indicated at 13.

Figure 1:
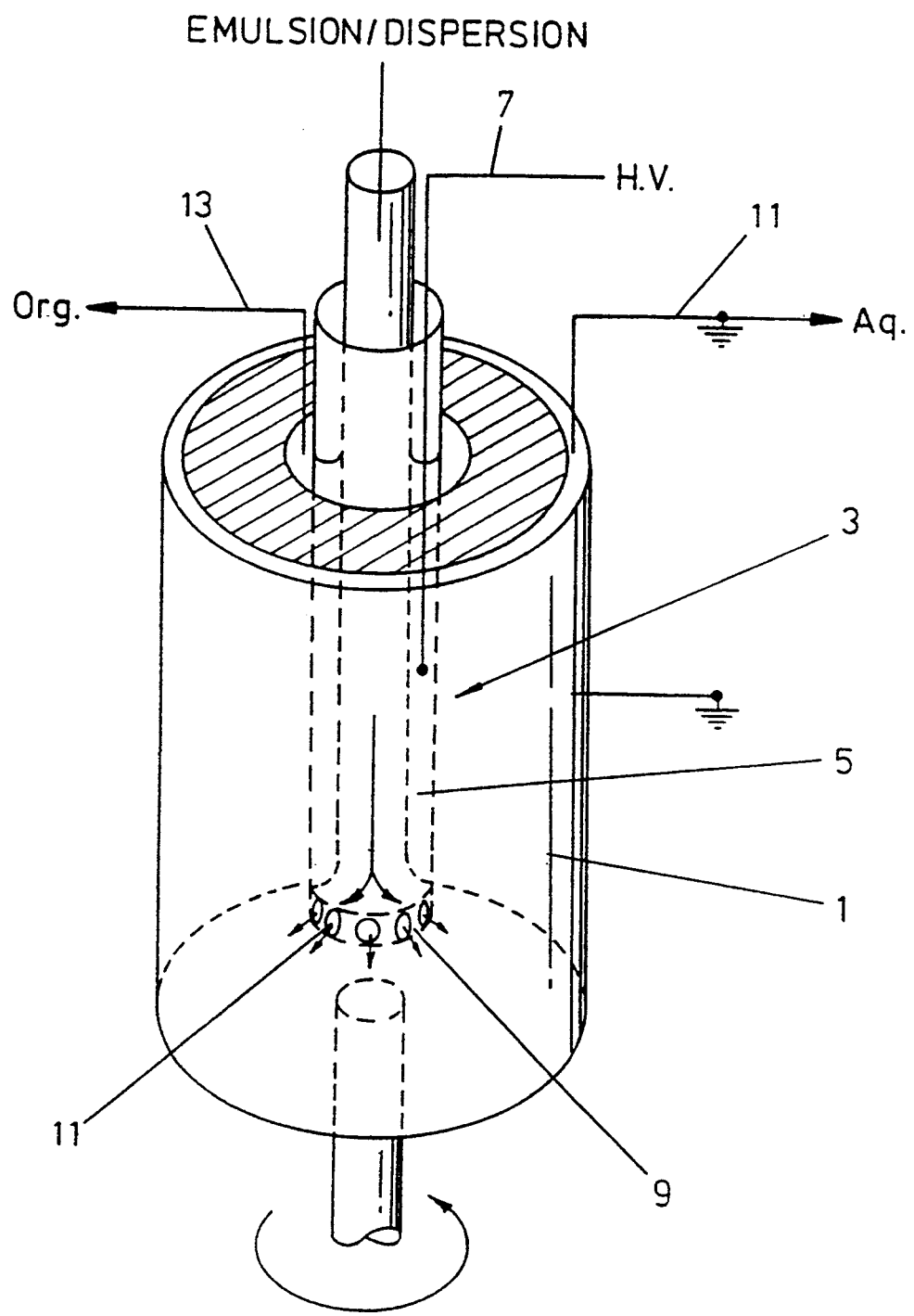
FIG. 1 shows in diagrammatic form apparatus in accordance with the present invention.
Figure 2:
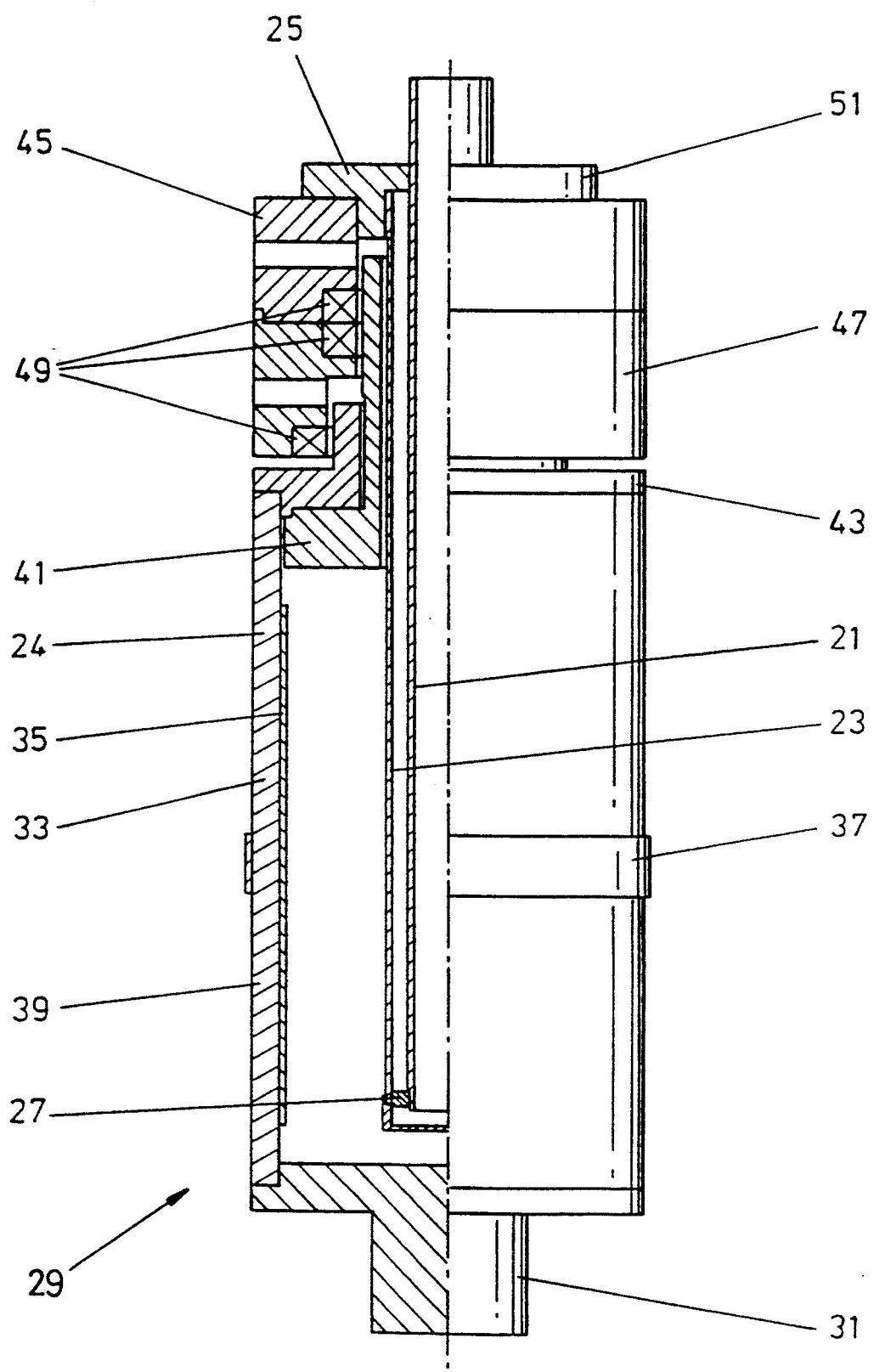
FIG. 2 shows in more detail and in part longitudinal section, the apparatus of FIG. 1.
Figure 3:
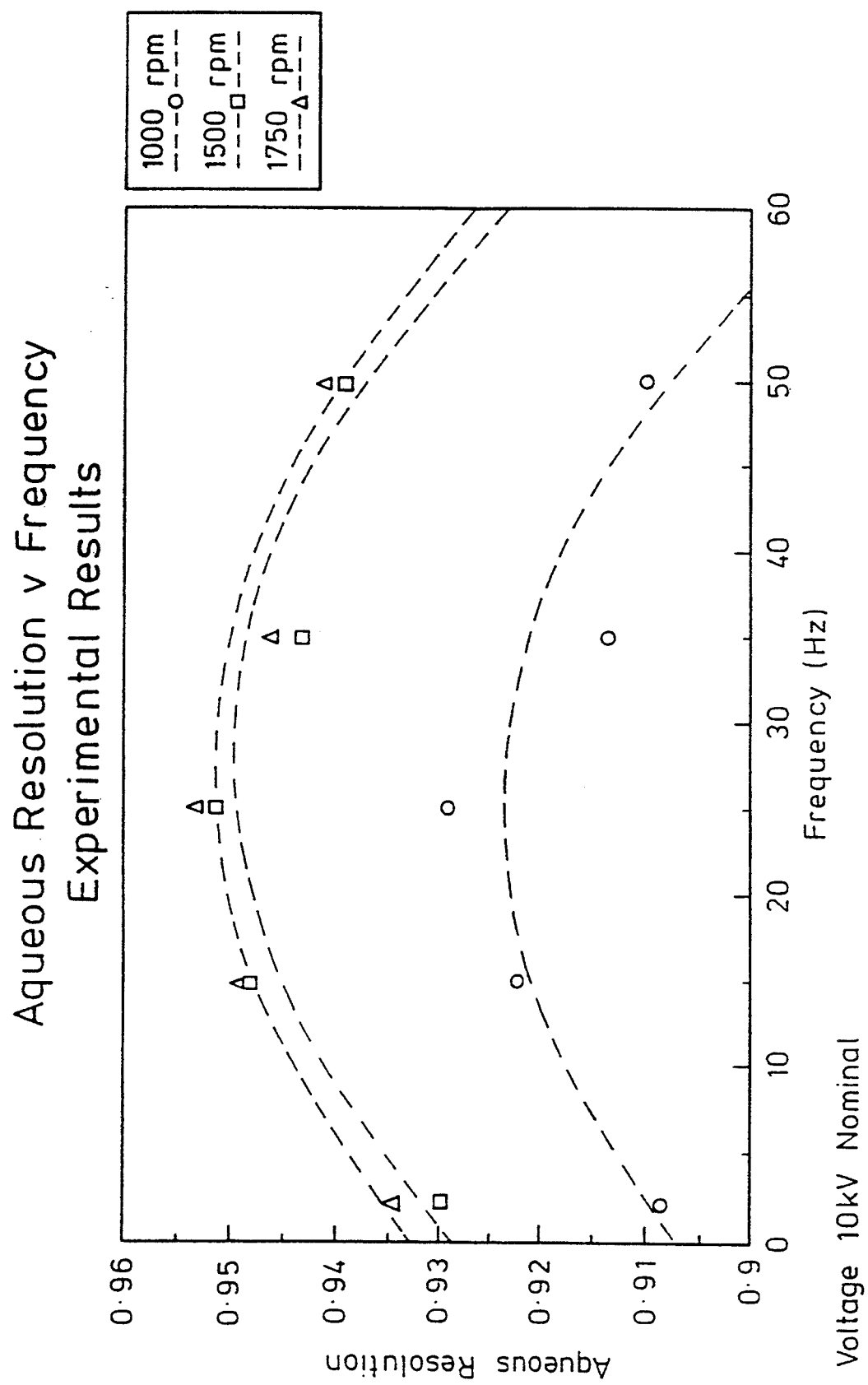
FIGS. 3 to 7 show results obtained with the apparatus of FIGS. 1 and 2.
Figure 4:
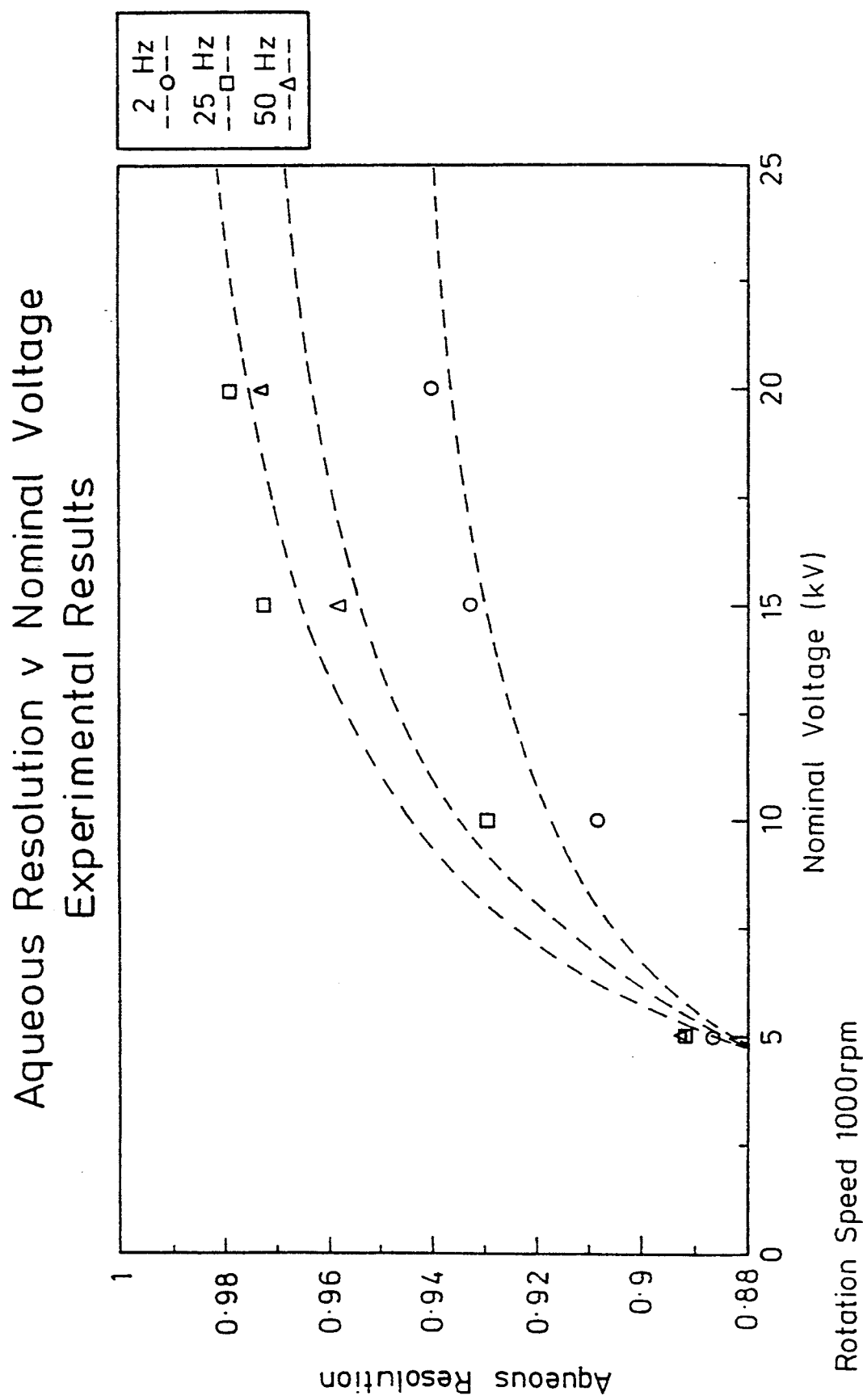
Figure 5:
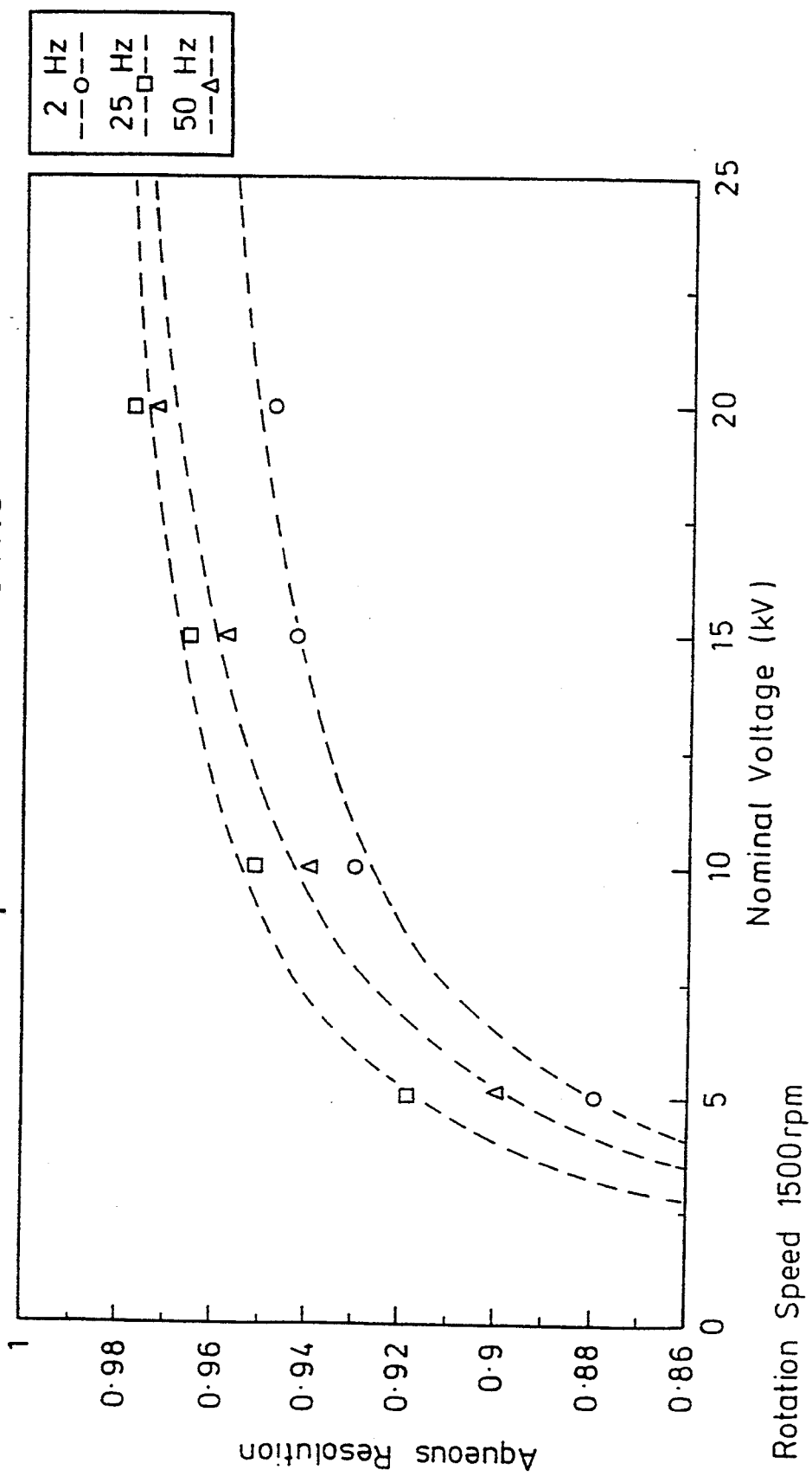
Figure 6:
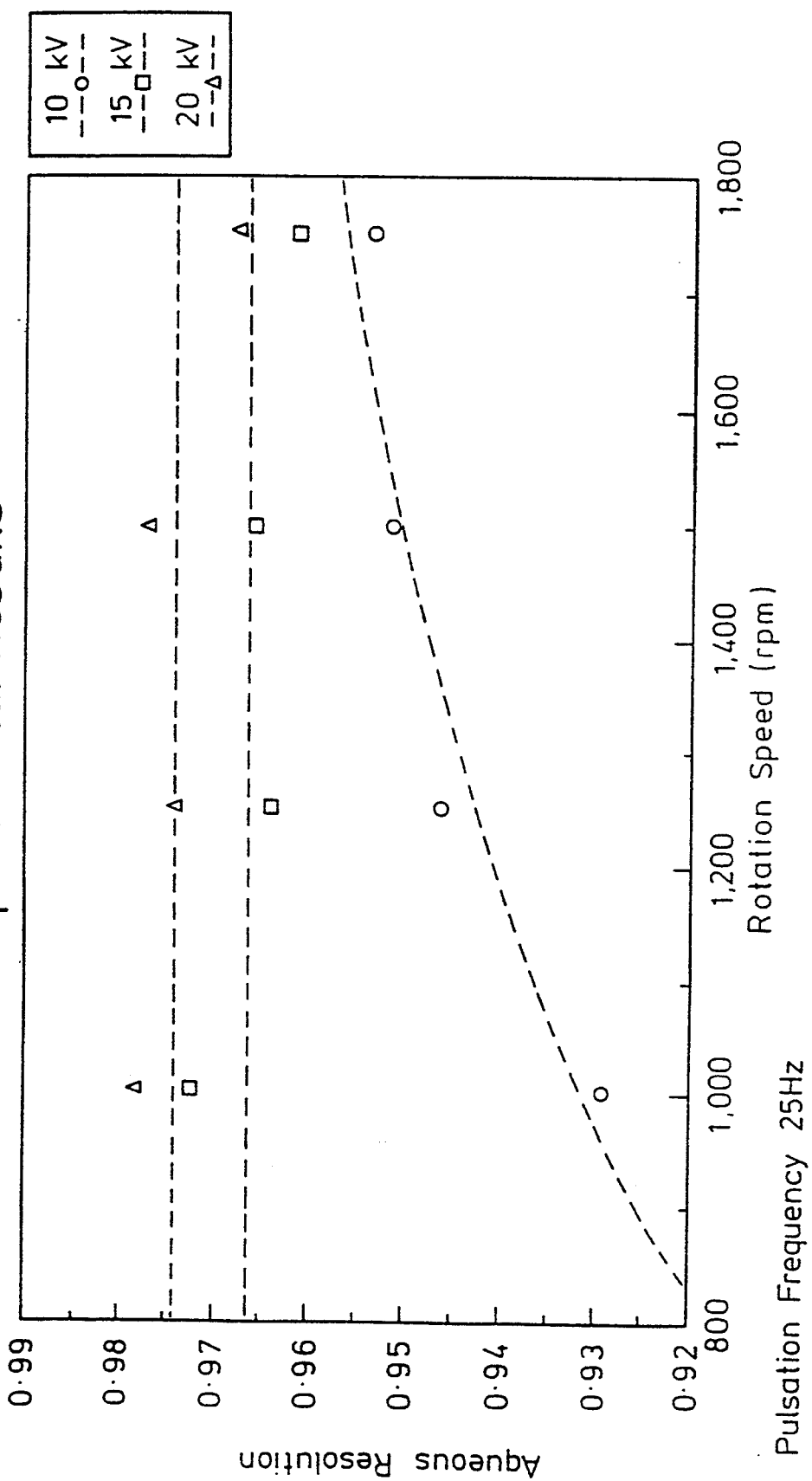

Referring to the more detailed depiction of the apparatus in FIG. 2 of the accompanying drawings, it can be seen that the electrode and inlet assembly consists of two circular tubes, 21, 23 arranged concentrically and connected at one end by support plate 35 and at the other end by an end cap 27.

The electrode and inlet assembly is constructed from ABS plastics material throughout, except the support plate 25, which is made from TUFNOL. ABS is a good electrically insulating material.

The coalescer body 24 includes bottom plate 31 which is made of TUFNOL and serves both as an endplate for the coalescer body and as a means of mechanical connection to a drive motor via a steel shaft (not shown).

The coalescer body 24 also includes a tubular portion 33 which is made up of an aluminium inner electrode 35, an aluminium outer electrode 37 and a TUFNOL shell 39. The inner electrode 35 is in mechanical and electrical contact with the outer electrode via four aluminium rivets (not shown). This outer electrode 37 is connected to electrical earth by a lightning conductor-type structure that extends to the bearing arrangement below the vessel which, in turn, is in direct contact with earth.

Two weir plates partially enclose the top of the coalescer body. These weir plates are organic weir plate 41 and aqueous weir plate 43. The complicated pattern of grooves and annular gaps shown in FIG. 2 enable the aqueous and organic phases to be removed by different routes. The separated aqueous phase passes through the annular gap between the coalescer shell and the organic weir plate 41. From this point, it is directed through the channels machined in the aqueous weir plate 43, through the annulus between the two weir plates and then to the outlet port. The dewatered organic phase exits via the annulus created by the electrode insulation and the organic weir plate 41 to emerge in the upper seal housing 45 where it finally emerges in the outlet port. The organic and aqueous weir plates 41, 43 are both made from TUFNOL.

In addition to upper seal housing 45, there is provided lower seal housing 47. These seal housings enclose seals 49. The seal housings are made of TUFNOL which is an insulating material and is chemically inert to the liquids used. The lower two seals and the lower seal housing isolate the aqueous phase while the uppermost single seal and the electrode and inlet support plate 51 isolate the organic phase. The seals are of the lip type made of nitrile rubber.

The centrifuge drive motor (not shown) is capable of rotating the vessel at speeds of up to 2,000 rpm and is infinitely variable over the range 1,000 to 2,000 rpm.

A water-in-oil emulsion was prepared by appropriate mixing of the following components:
33% distilled water
33% ISOPAR M kerosene
33% light liquid paraffin BPC
1% SPAN 80 surfactant.

Figure 7:
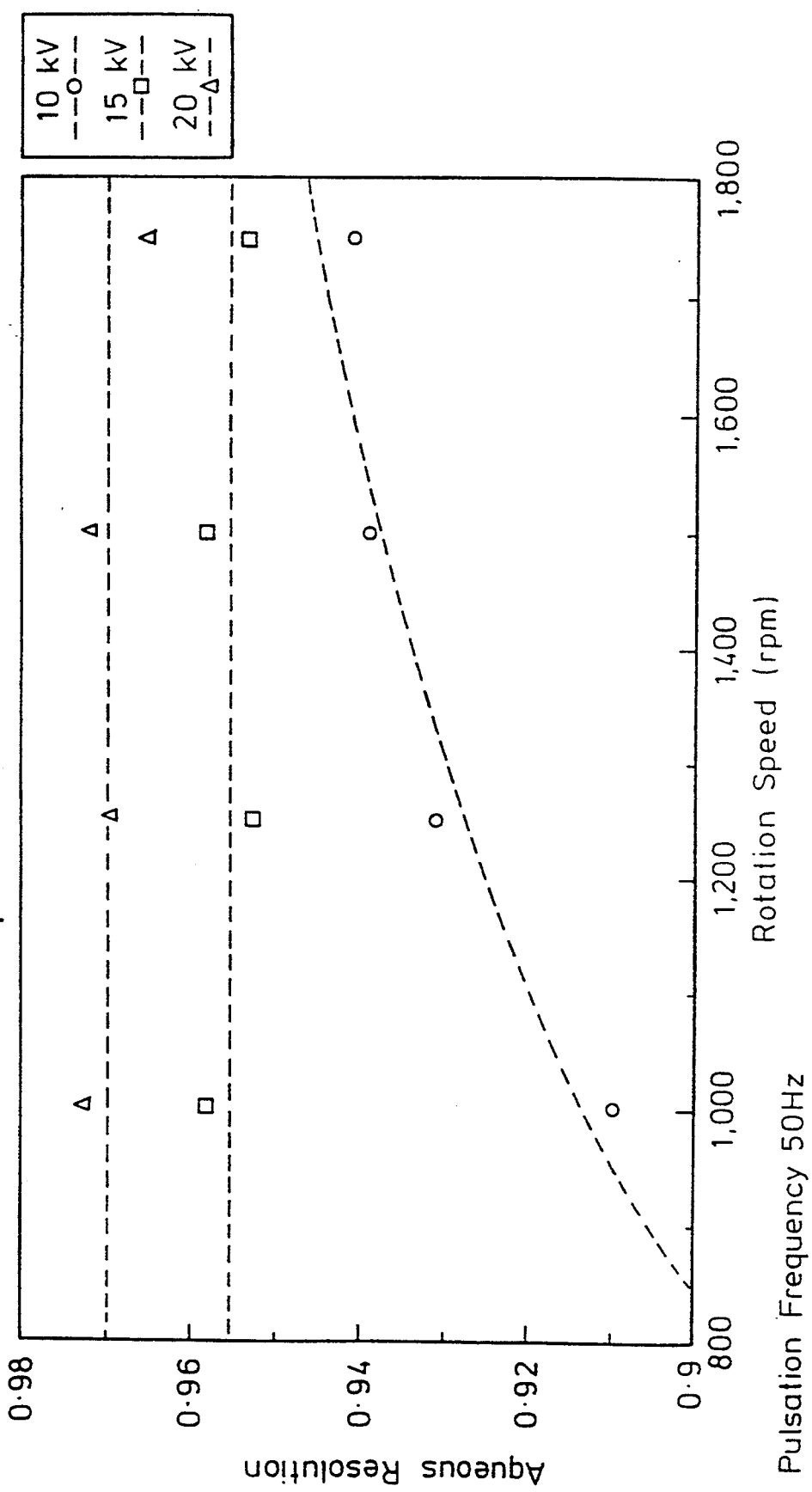

This emulsion was fed to the above-described apparatus and measurements were taken of the aqueous content of the effluent organic phase in order to determine its percentage resolution under varying conditions. These results are represented in FIGS. 3 to 7. In each case, the emulsion flowrate was maintained at 75 ml/min. It will be seen that for a given speed of rotation of the vessel, there is an optimum frequency for the applied pulsed electric field. For a given pulse rate, the resolution increases rapidly between an applied nominal voltage of 5 and 15 kV and then increases more slowly beyond 15 kV. A pulse rate of 25 Hz gave the best resolution. The effect of rotation speed on resolution is demonstrated in FIGS. 6 and 7, and it will be seen that at an applied voltage of 10 kV the resolution increases as the rotation speed increases from 1,000 to 1,800 rpm. However, at higher applied voltages (15 and 20 kV), resolution is at a higher level and is independent of rotation speed. This effect is shown at pulsation frequencies of 25 Hz (FIG. 6) and 50 Hz (FIG. 7).

We claim:

1. A method of separating the components of a dispersion or emulsion of at least one electrically-conducting liquid in at least one liquid of lower electrical conductivity, comprising the steps of:

collecting the emulsion or dispersion in a vessel;

applying to the emulsion or dispersion within the vessel an electric field via at least on pair of spaced electrodes; and rotating the emulsion or dispersion to apply simultaneously thereto a centrifugal force aligned with the electric field, so as to establish within the electric field a bulk interface between the dispersion or emulsion and one separated component thereof, wherein at least one of each pair of electrodes is separated from the dispersion or emulsion by a layer of electrically insulating material and the voltage across the electrodes is pulsed at a frequency of from 1.5 to 50 Hz.

2. A method according to claim 1 wherein the electric field is a unidirectional electrostatic field applied between a relatively high voltage electrode and a relatively low voltage electrode.

3. A method according to claim 2 wherein the relatively high voltage electrode is separated from the dispersion or emulsion by a layer of electrically insulating material.

4. A method according to claim 2 wherein the voltage applied to the relatively high voltage electrode is between 10 and 20 kV.

5. A method according to claim 1 wherein the centrifugal force is applied either by means of a mechanical centrifuge or by means of a hydrocyclone.

6. Apparatus for separating the components of a dispersion or emulsion of at least one electrically-conducting liquid in one or more liquids of lower electrical conductivity, comprising:

a vessel adapted to contain the emulsion or dispersion;

at least one pair of spaced electrodes;

means for applying a voltage across the electrodes pulsed at a frequency of from 1.5 to 50 Hz to apply an electric field to the dispersion or emulsion within the vessel; and means for rotating the emulsion or dispersion to apply simultaneously thereto a centrifugal force aligned with the electric field, so as to establish within the electric field a bulk interface between the dispersion or emulsion and one separated component thereof, wherein at least one of the electrodes of each pair is separated from the dispersion or emulsion by a layer of electrically insulating material.

7. Apparatus according to claim 6, wherein the vessel is a rotating vessel of a mechanical centrifuge.

8. Apparatus according to claim 6, adapted for use in a continuous liquid/liquid separation process.

9. Apparatus according to claim 8, including a pair of electrodes of which one surrounds and is radially separated from, the other of the pair.

10. Apparatus according to claim 9 wherein the vessel is substantially cylindrical, the outer of the two electrodes is located at or near the periphery of the vessel and the inner of the two electrodes is located at or near the axis of the vessel.

11. Apparatus according to claim 9 wherein the inner electrode surrounds an inlet for the liquid/liquid dispersion or emulsion, said inlet extending along the vertical axis of the vessel and having radially-directed apertures such that the liquid/liquid dispersion or emulsion enters the bulk liquid located within the vessel through the radially-directed apertures.

12. Apparatus according to claim 9 wherein the vessel is capable of being rotated at a speed in the range of 1,000–2,000 rpm.

13. Apparatus according to claim 12 wherein the vessel is capable of being rotated at a speed in the range of 1,500–1,800 rpm.

14. Apparatus according to claim 6, adapted for use in a batch-wise liquid/liquid separation process.

* * * * *